United States Patent [19]

Hester

[11] Patent Number: 4,828,149
[45] Date of Patent: May 9, 1989

[54] TILTABLE METERING DISPENSER

[76] Inventor: Kenneth D. Hester, 10042 Connell, Overland Park, Kans. 66212

[21] Appl. No.: 90,606

[22] Filed: Aug. 28, 1987

Related U.S. Application Data

[63] Continuation-in-part of Ser. No. 27,731, Mar. 19, 1987, abandoned.

[51] Int. Cl.⁴ ............................................. G01F 11/26
[52] U.S. Cl. ..................... 222/207; 222/221; 222/212; 222/394; 222/437; 222/440; 222/442; 222/456; 222/464; 222/481
[58] Field of Search ............... 222/207, 211, 212, 213, 222/464, 481, 484, 443, 456, 454, 547, 437, 537, 394, 402.1, 402.18, 402.19, 402.2, 205; 239/37, 354

[56] References Cited

U.S. PATENT DOCUMENTS

| | | | |
|---|---|---|---|
| 143,567 | 10/1873 | Foster | 222/456 |
| 403,544 | 5/1889 | Maranville | 222/456 |
| 476,342 | 6/1892 | West | |
| 490,493 | 1/1893 | Olmsted | |
| 987,970 | 3/1911 | Earl | 222/377 X |
| 1,178,512 | 4/1916 | Garlock | |
| 1,270,262 | 6/1918 | Buckland | 222/437 |
| 1,286,133 | 11/1918 | Snyder | |
| 1,877,808 | 9/1932 | Cagliostro | 222/456 |
| 2,877,810 | 3/1959 | Zackheim | 141/24 |
| 2,989,216 | 6/1961 | Moro-Lin | 222/211 X |
| 3,178,081 | 4/1965 | Adams | 222/211 X |
| 3,224,652 | 12/1965 | Cadwig et al. | 222/443 X |
| 3,255,926 | 6/1966 | Modderno | 222/136 |
| 4,684,045 | 8/1987 | Su | 222/456 |

FOREIGN PATENT DOCUMENTS

| | | | |
|---|---|---|---|
| 2219582 | 10/1973 | Fed. Rep. of Germany | 222/456 |
| 760765 | 12/1933 | France | 222/456 |

Primary Examiner—Kevin P. Shaver
Attorney, Agent, or Firm—Kokjer, Kircher, Bradley, Wharton, Bowman & Johnson

[57] ABSTRACT

A dispensing device for dispensing measured doses during each dispensing cycle. A fluid tight bottle is provided with a well at its bottom. A hollow shell fits in the well and includes an opening permitting flow of material from the bottle into the shell. A tubular stem extends from the shell through the top of the bottle and terminates in a dispensing spout. Different embodiments provide different arrangements for supplying air to an air chamber in the top of the bottle so that pressure within the bottle can equalize at the end of each dispensing cycle. If the bottle is not a squeeze bottle, air is supplied to the bottom of the bottle to displace the liquid in the shell which is dispensed through the stem upon inversion of the bottle. Additional embodiments of the invention are specially constructed to dispense powders and to allow the dosage of each dispensing cycle to be adjusted.

13 Claims, 4 Drawing Sheets

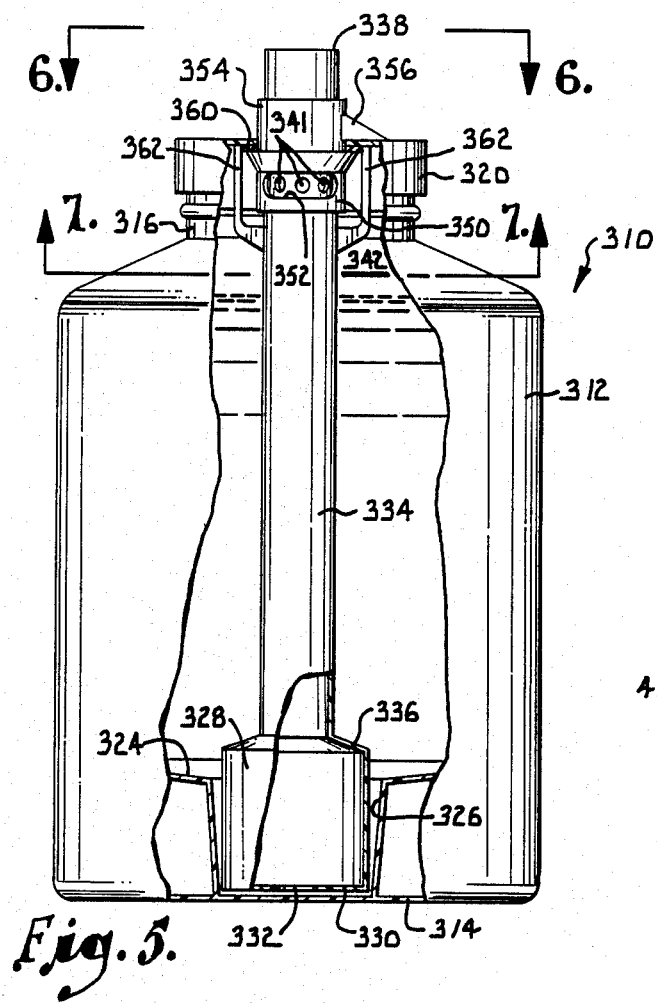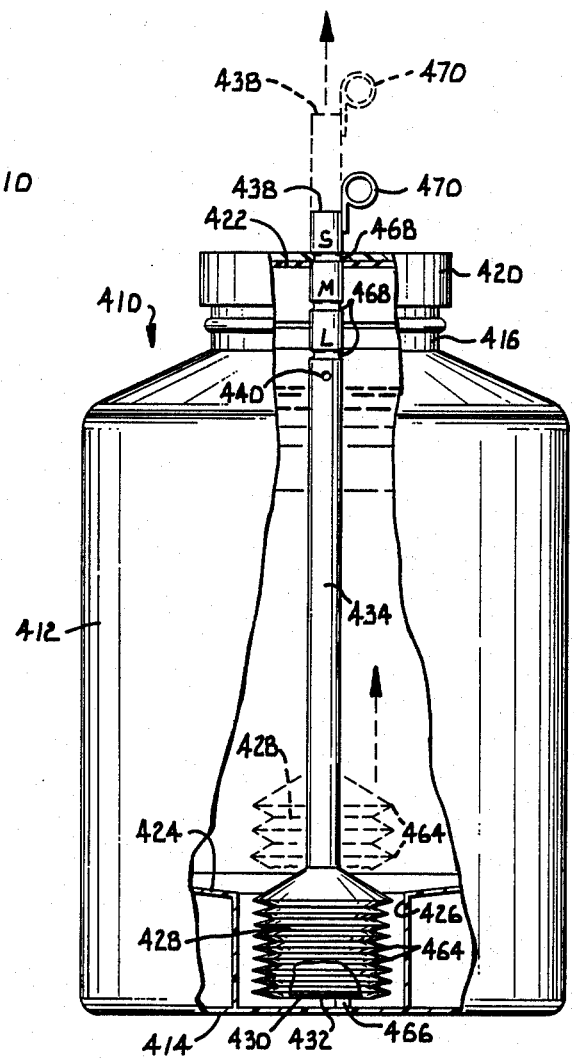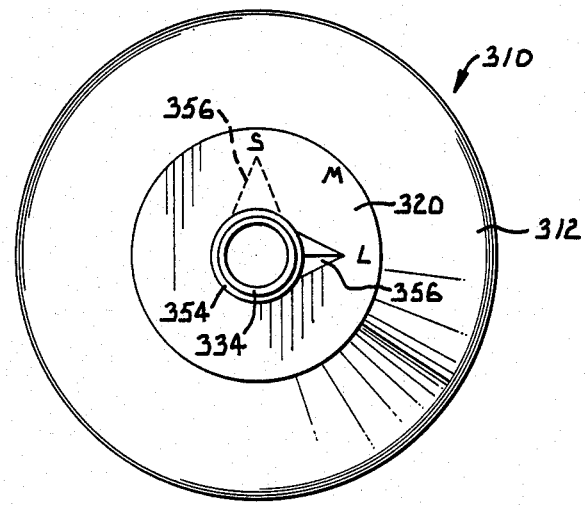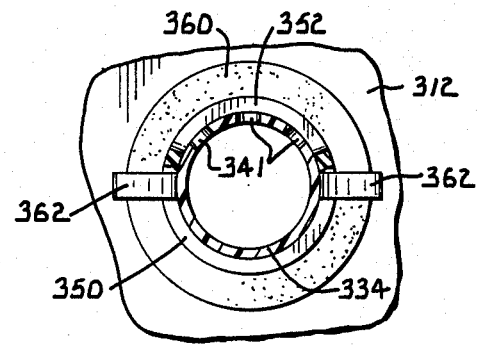
Fig. 5.
Fig. 6.
Fig. 7.
Fig. 8.

TILTABLE METERING DISPENSER

BACKGROUND AND SUMMARY OF THE INVENTION

This application is a continuation in part of application Ser. No. 027,731, filed on Mar. 19, 1987, now abandoned, and entitled "Dispensing Device".

This invention relates generally to the dispensing of liquids and particulate materials such as powder and granular materials. More particularly, the invention deals with a dispensing device that is constructed to dispense materials in measured amounts.

Liquids such as liquid soap and bleach must be applied in measured doses in order to effectively perform their intended functions. Powders, granulated materials and other particulates are likewise often applied in measured amounts. The cap which covers the container for the product is commonly used for measurement purposes. In the case of liquids, the use of the cap to measure the amount of the product to be used can create a considerable mess. In the case of both liquids and particulate materials, considerable time is consumed in filling the cap to the required level and then pouring out the contents of the cap. It is also common for the doses to vary significantly when this procedure is used. If it is intended for the dosage to be increased or decreased, "eyeballing" is typically employed and considerable inaccuracies can result.

The present invention is directed to a container which is specially constructed to utilize hydraulic principles for the dispensing of measured doses of liquids and solids. It is a particularly important feature of the invention that the container has a simple construction and is devoid of mechanical complexities, thus permitting it to be mass produced at a relatively low cost.

In accordance with one embodiment of the invention, a fluid tight squeeze bottle is provided with a well at the bottom. A hollow shell fits in the well and has a bottom opening which allows the entry of liquid. A tubular stem extends upwardly from the shell through the top of the bottle and terminates in a dispensing spout from which liquids are dispensed from the bottle. The stem has an orifice which permits equalization of pressure within the bottle after each dispensing cycle.

When the bottle is upright, liquid fills the shell and stem to the liquid level in the bottle. After the bottle has been inverted, the amount of liquid that is captured in the shell and stem can be dispensed by squeezing the sides of the bottle. The pressure is applied to the air that is trapped in the bottle and is transmitted to the liquid in the shell, causing it to be dispensed through the spout.

Alternatively, the bottle maybe pressurized with gas. A pressurized bottle uses gas pressure to expel the contents when a valve is operated, and at the same time provides a contaminant free environment which maintains the contents in a sterile condition.

It is a particularly important feature of the invention that various factors, including the sizes of the components, can be selected to give optimum results for the particular applcation that is encountered. The speed of the dispensing, the accuracy of the dosages, the time between dispensing cycles and other variables can be adjusted as desired to meet the different requirements that may be involved when different types of liquids are being handled.

A second embodiment of the invention functions to dispense particulate materials and is specially constructed for dispensing powders and/or granulated materials in measured doses. A third embodiment incorporates modifications that make the device capable of dispensing liquids in measured doses without the need for employing a squeeze bottle.

Additional embodiments of the invention are constructed to allow the user to quickly and easily adjust the amount of material that is dispensed during each dispensing cycle. This is accomplished by the use of relatively simple mechanisms which are "user friendly" and yet permit the dosage to be accurately adjusted without appreciable increase in the complexity of the dispenser construction.

In accordance with still further embodiments of the invention, one or more valves may be provided in order to accommodate pressure equalization between dispensing cycles and to allow dispensing of the liquid without creating vacuum.

DETAILED DESCRIPTION OF THE INVENTION

In the accompanying drawings which form a part of the specification and are to be read in conjunction therewith and in which like reference numerals are used to indicate like parts in the various views:

FIG. 5 is an elevational view of yet another embodiment of the dispensing device, with portions broken away for illustrative purposes;

FIG. 6 is a top plan view taken generally along line 6—6 of FIG. 5 in the direction of the arrows, with the broken lines illustrating the dose adjustment mechanism at the "small" setting;

FIG. 7 is a fragmentary sectional view on an enlarged scale taken generally along line 7—7 of FIG. 5 in the direction of the arrows;

FIG. 8 is an elevational view of a still another dispensing device which includes another type of dose adjustment arrangement with the broken lines illustrating the "large" setting of the dosage;

Figure 1:
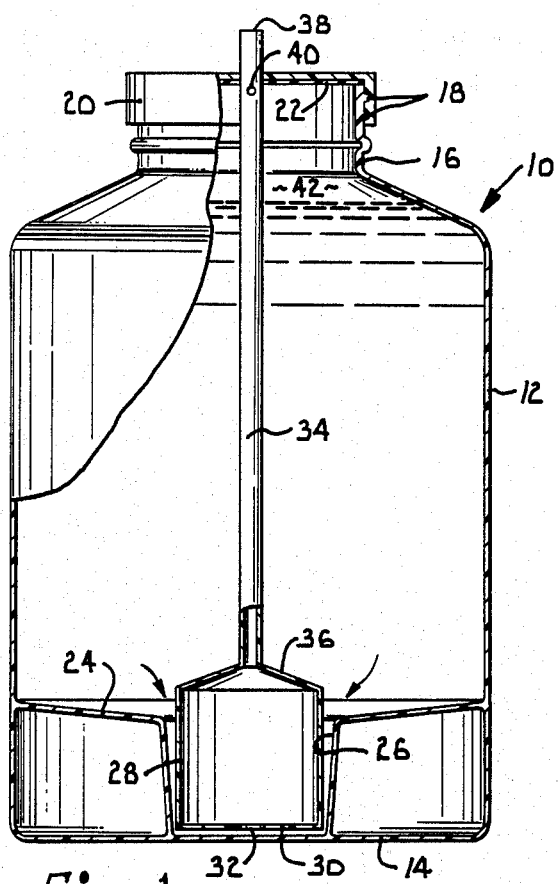
FIG. 1 is an elevational view of a dispensing device constructed according to a first embodiment of the present invention, with portions shown in cross section for purposes of illustration.
Figure 2:
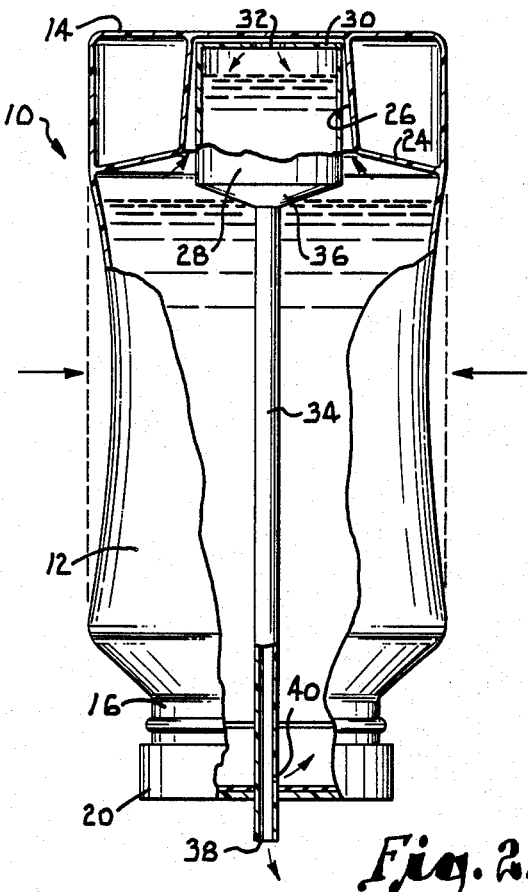
FIG. 2 is an elevational view of the device of FIG. 1 shown in an inverted position with the sides squeezed inwardly to dispense liquids, portions being broken away for purposes of illustration.

Referring now to the drawings in more detail and initially to FIGS. 1 and 2, numeral 10 generally designates a dispensing device constructed in accordance with a first embodiment of the present invention. The dispensing device 10 includes a squeezable container 12 which preferably takes the form of a squeeze bottle. The container 12 may be of virtually any desired shape and size and may be constructed of a thin wall plastic or another suitable material that permits the container wall to be squeezed inwardly. Container 12 has a flat bottom 14 and tapers near its top portion to provide a beaded neck 16. The top portion of neck 16 is exteriorly threaded at 18. A removable cap 20 is interiorly threaded to mate with the threads 18, thus securing the cap 20 in place on top of the neck 16. A gasket 22 provides a fluid tight seal between the cap 20 and the upper edge of neck 16 of the squeeze bottle. It is noted that cap 20 can be removed by threading it off of the neck 16.

Container 12 has a false bottom 24 spaced above bottom 14. An open topped well 26 is formed in the center of the false bottom 24 and extends to the true bottom 14. The false bottom 24 inclines downwardly toward the well 26 in order to direct the liquid contents of the container into the well. The well 26 is generally cylindrical.

A hollow shell 28 is received in the well 26. Shell 28 has a generally cylindrical sidewall and a flat bottom 30 provided with an inlet port 32 at its center. The flat bottom 30 is adjacent to the bottom 14 of the container.

A hollow tubular stem 34 extends upwardly from the shell 28. Stem 34 is much smaller in diameter than shell 28. The shell and stem are connected by a funnel 36 which inclines upwardly from the top edge of shell 28 to the lower edge of stem 34. Stem 34 extends centrally through and is sealed to the cap 20. The top end of stem 34 is located outside of container 12 and is open to provide a dispensing spout 38 from which the contents of the container are dispensed.

An orifice 40 is formed in the side of stem 34 at a location within the neck 16 of the container. The orifice 40 opens into an air chamber 42 which is formed within container 12 above the level of the liquid it contains. The volume of the air chamber 42 varies depending upon the quantity of liquid remaining within the container.

In use, container 12 holds liquid soap, liquid bleach or another liquid which is to be dispensed in measured doses. When the container is upright, the liquid contained within container 12 enters shell 28 through port 32 and rises within stem 34 to the level of the liquid in the container. Any air which is displaced in shell 28 and stem 34 escapes into air chamber 42 through the orifice 40.

In order to dispense a measured amount of liquid, the container 12 is inverted to the position shown in FIG. 2. The air which was previously contained within the air chamber 42 is now located adjacent to the shell 28. When the sides of the container 12 are squeezed with the hand from the broken line position of FIG. 2 to the solid line position, the air within the container is compressed and the pressure is transmitted through port 32 to the liquid which is contained within shell 28 and stem 34 (and also to the liquid in the main part of the bottle). The pressure causes the liquid within the shell and stem to be dispensed through the stem and out of the spout 38. The pressure exerted on the sides of the squeeze bottle empty the shell and stem, and when they have been emptied, air begins to escape through spout 38, thus signaling an end to the dispensing period. At this time, the measured amount of liquid contained within the shell and stem has been dispensed. Depending upon size variables, proportional amounts of liquid are forced by the pressure through orifice 40 and into stem 34. This liquid is dispensed along with the liquid which is trapped in the shell and stem upon inversion of the bottle.

At the end of the dispensing cycle, the bottle is returned to the upright position of FIG. 1, and its sides are released and revert to their normal position. Liquid then naturally flows into shell 28 again and rises in stem 34 to the liquid level in the bottle. The air that is displaced is expelled through orifice 40 into the air chamber 42. Another dose of liquid can then be dispensed by inverting the bottle and squeezing its sides again in the manner indicated previously. The presence of the well 26 assures that the bottle can be fully emptied, and it also stabilizes the stem, especially for relatively small diameter stems constructed of certain materials. However, the well 26 may be eliminated and the shell may then simply rest on the bottom of the container.

The volume of liquid that is dispensed during each dispensing cycle depends upon a number of factors, including the volume of the shell 28, the diameter and length of the stem 34, the area of orifice 40, the viscosity and specific gravity of the liquid, the amount of pressure applied to the sides of the bottle, and the size of opening 32 (which controls spillage from shell 28 upon inversion of the bottle).

It is apparent that the total volume dispensed during each dispensing cycle is equal to the total volume of liquid contained within shell 28 and stem 34 plus the volume of liquid that is dispensed through orifice 40. It is important to note that the volume of liquid contained within stem 34 varies between the maximum when the bottle is full and the minimum when the bottle is nearly empty and the liquid level drops below the bottom end of the stem. Thus, the amount dispensed in each dose can vary between the minimum and maximum amounts.

In order to minimize the percentage variation in the dosage, the volume of the shell 28 should be large in comparison to that of the stem 34. The percentage difference in the maximum and minimum dosages is determined by dividing the volume of liquid contained in stem 34 when bottle 12 is full by the volume of shell 28 plus the volume of liquid contained within stem 34 when the bottle is full. Normally, the volume of tube 34 is no more than about 5% of the volume of shell 28, so the dose variation is no more than about 5% which is acceptable for most applications. Because some liquid is dispensed through orifice 40, the percentage of error in the dosage is actually even less than the above calculation would indicate.

Opening 32 can possibly occupy the entire bottom 30 of the funnel, but this reduces the accuracy of the dosages because it allows liquid to spill out of shell 28 back into the bottle during the time it takes the bottle to be moved from the upright position to the inverted position. By providing a relatively small opening 32, the spillage is minimized and the accuracy is enhanced. However, there is a tradeoff because with a small opening, it takes a relatively long time for liquid to enter shell 28 and rise within stem 34 to the liquid level in the bottle. Thus, it takes a relatively long time for the equilibrium state to be reached so that the bottle is ready for the next dispensing cycle. With nonviscous fluids, a relatively small opening 32 can be used. However, with viscous fluids and very small openings 32, it can take a considerable length of time for the equilibrium state to be reached, and the opening should be enlarged if viscous fluids are being handled.

The diameter of stem 34 has an effect both on the amount of liquid dispensed during each dispensing cycle and the time it takes to complete the dispensing. The flow rate through tube 34 can be approximated by the pipe formula:

$$Q = \Delta P \pi D^4 / 128 \mu l$$

where
Q equals the flow rate of liquid through tube 34,
$\Delta P$ equals the pressure difference;
D equals the diameter of the tube,
$\mu$ equals the viscosity of the liquid; and
l equals the length of tube 34.

The inaccuracies that result from using this formula are due to at least two inaccurate assumptions: steady flow is assumed although at times the pipe contains both air and liquid at both the beginning and end of each dispensing cycle; and steady pressure is assumed although the bottle is squeezed in various ways by various users. Even taking into account these inaccuracies, the pipe formula is useful in illustrating the principles that are involved. The larger the diameter of tube 34, the more quickly the contents of the shell and tube will be dispensed. However, if the diameter of the pipe is too large, gurgling and leakage can occur before the container is squeezed, resulting in inaccurate doses. Large diameter tubes also increase the variation in the dosages because larger tube diameters increase the tube volume. On the other hand, if the diameter of the tube is too small, the dispensing time is unacceptably long. There is an optimum diameter for tube 34 depending upon the size of orifice 40, the volume of shell 28 and the viscosity of the particular liquid that is being handled.

The length of tube 34 is important to both the dispensing rate and the dosage accuracy. The tube length is directly proportional to the tube volume, and the pipe formula set forth above indicates that the dispensing rate is reduced in direct proportion to the tube length. The greater the tube length, the greater will be the friction generated in the tube, thus decreasing the flow rate. Ideally, tube 34 should be as short as possible, although aesthetic considerations make it impossible for the tube to be too short.

The orifice 40 equalizes pressure in the bottle after each dispensing cycle and also provides a route for dispensing of some of the liquid. The orifice should not be so small that pressure equalization takes an objectionable time period. It also should not be so small that it becomes easily clogged.

The flow rate through orifice 40 is illustrated by the following equation:

$$Q_0 = 2A_0 C \sqrt{2\Delta P}$$

where
$Q_0$ equals the flow rate through the orifice,
$A_0$ equals the area of the orifice,
$\Delta P$ equals the pressure change, and
C equals a flow coefficient dependent upon the sharpness of the orifice edges as well as the Reynolds number (which in turn varies with viscosity and pressure).

This equation is likewise somewhat inaccurate because it assumes steady pressure conditions which do not exist in actual practice. Even so, the formula illustrates that more liquid is dispensed as the orifice size increases. If the orifice is too large, proper dispensing action can be impeded. The orifice size should be selected at an optimum size which is large enough to prevent clogging and allow for quick equalization of pressure in the bottle and yet small enough to avoid significant adverse effects on the doses that are dispensed. Orifice 40 should be as close as possible to the top of neck 16 in order to insure immersion in the liquid to prevent admittance of air upon inversion.

The formulas set forth previously indicate that viscosity has a more pronounced effect on the rate of emptying of shell 28 than it does on the rate of flow through orifice 40. Thus, viscosity must be taken into account in selecting the sizes of the components. The effect of specific gravity of the liquid is usually not very important, although it should be considered if the liquids that are being handled vary widely in their specific gravities. Although the amount of pressure applied to the sides of the bottle can create significant differences in the dispensing of the product, the other variables can be selected such that wide variations in the pressure applied to the bottle have little effect upon the volume of product that is dispensed during each dispensing cycle.

The foregoing factors can be taken into account and selected to provide optimum dispensing results for each situation that is encountered. The parameters noted above can be selected to achieve the necessary accuracy in the measured doses that are dispensed, while at the same time permitting acceptable dispensing rates and pressure equalization between dispensing cycles. It has been found that the relationships among the parameters can best be determined empirically.

It should be noted that the bottle may be a pressurized bottle in which the contents are maintained under pressure. The pressurized bottle is equipped with a finger operated valve (not shown) on the tip 38 which maintains the pressurized condition of the contents when closed and allows them to be propelled out under gas pressure when opened for dispensing. A dispensing cycle involves inversion of the bottle and operation of the valve until the liquid has all been dispensed and gas is exiting the bottle to signal the end of the dispensing operation. The pressurized bottle is affected by the same parameters previously described in connection with the squeeze bottle. The pressurized bottle offers a contamination free environment for the contents that are stored in it.

Figure 3:
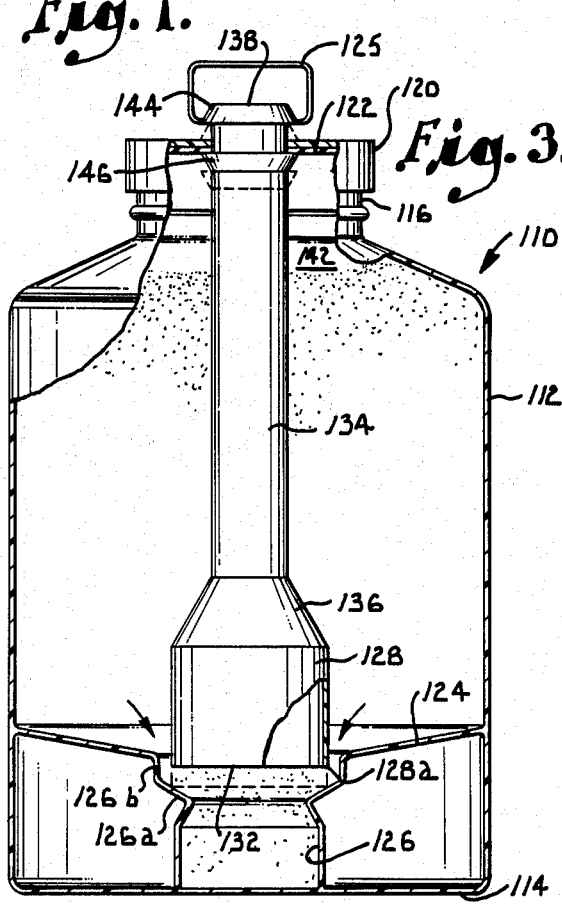
FIG. 3 is an elevational view of a dispensing device constructed according to a second embodiment of the present invention, with portions shown in cross section for purposes of illustration and the broken lines indicating the seated position of the inside container.

FIG. 3 illustrates a dispensing device 110 which is specially constructed for the dispensing of powders and granular materials. The dispensing device 110 includes a container 112 which may be identical to the container 12 shown in FIG. 1 for the most part. The only differences are in the provision of a handle 125 on the top end of the stem end in the configuration of the upper portion of the well 126. A seat 126a is formed by a generally annular shoulder which extends generally around the upper edge portion of well 126 and tapers somewhat from top to bottom. The seat surface 126a is connected with the false bottom 124 by a vertical wall 126b. The handle 125 may take the form of a wire bail or ring.

Device 110 includes a shell 128 which is constructed similarly to shell 28 but is too large in diameter to fit in the well 126. Shell 128 is smaller in diameter than seat 126a. In addition, shell 128 is open at the bottom to provide a large opening 132 which permits the powder and granular material to enter the shell upon inversion of the container. The lower circular edge 128a of shell 128 seats against the seat 126a, as shown in broken lines in FIG. 3.

Shell 128 is connected by a funnel 136 with a hollow tubular stem 134 which is considerably larger than stem 34 in order to permit easy flow of powder and granular material through the stem. Stem 134 extends centrally through cap 20 and terminates in an open spout 138 located outside of the bottle.

Figure 4:
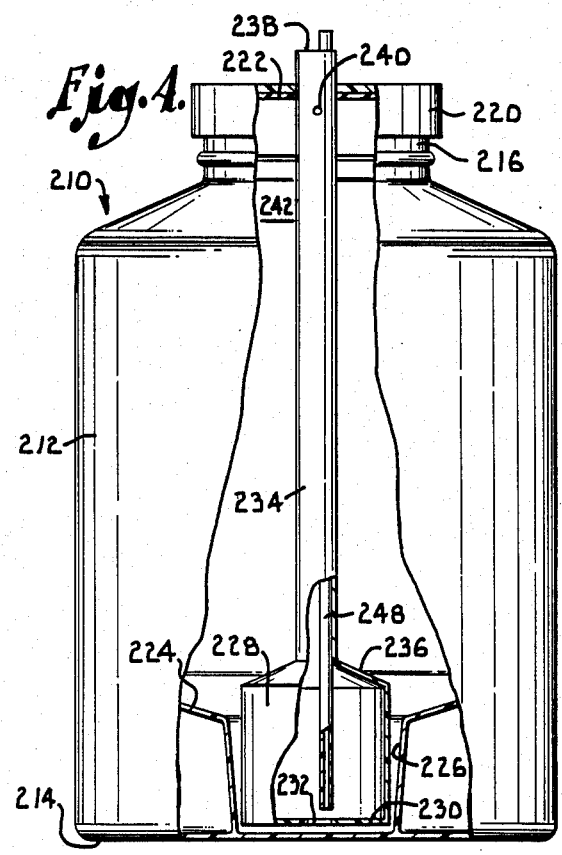
FIG. 4 is an elevational view of a dispensing device constructed according to a third embodiment of the present invention, with portions shown in cross section for purposes of illustration.

Stem 134 is movable axially relative to container 112 in order to permit movement of shell 128 between the unseated position shown in solid lines in FIG. 4 and the seated position shown in broken lines. Stops which limit movement of stem 134 are formed by upper and lower collars 144 and 146 fitted on stem 134 above and below cap 120. The upper stop 144 is ordinarily not required. Upward movement of stem 134 is limited by engagement of the lower stop collar 146 against the underside of cap 120. Conversely, movement of stem 134 downwardly is limited by engagement between the lower edge of shell 128 and the seat 126a.

In use, the dispensing device 110 is filled to the desired level with powder or granular material. Above the level of the material in the bottle, an air chamber 142 is formed. During transport and at other times when the contents are not being dispensed from the bottle, shell 128 is lowered to the seated position shown in broken line in FIG. 3. The shell then blocks entry of powder into well 126.

In order to dispense a measured dose of the contents of container 12, stem 134 is raised by pulling upwardly on the handle 125 to lift shell 128 to its unseated position. The bottle can then be gently agitated such that powder flows around the lower edge 128a of the shell until well 126 is filled. The bottle is then inverted to permit the material in well 126 to enter shell 128, and the material flows through stem 134 and spout 138, thus dispensing an amount of material equal to the volume of well 126.

An orifice (not shown) may be provided in stem 134 in communication with the air chamber 142. However, such an orifice is usually not necessary because most granules and powders do not pack together tightly enough to create a vacuum in the upper portion of the bottle.

In the dispensing device 110, the amount of material that is dispensed during each dispensing cycle is equal to the volume of well 126. The well 126 may be made adjustable in its volume in order to vary the dispensing dosage. This can be effected by providing a floor of the well that may be raised and lowered, through a sliding sleeve mechanism, an accordian type construction, or in any other suitable manner. The shell 128 must be able to be seated against and unseated from the seat 126a, and the shell must have a larger volume than the well 126.

FIG. 4 illustrates a dispensing device 210 which is identical to dispensing device 10 for the most part. The only differences are that the container 212 need not be squeezable, stem 234 is preferably larger in diameter than stem 34, and a small diameter tube 248 is included in extension through stem 234. Tube 248 is much smaller in diameter than stem 234 and is somewhat longer. The opposite ends of tube 248 are open, with the lower end opening within shell 228 and its upper end extending above the spout 238 formed on the top end of stem 234. Tube 248 is preferably secured to the wall of the larger stem 234.

In use, the dispensing device 210 holds a quantity of liquid within container 212. The liquid enters shell 228 through opening 232 and rises within stem 234 and tube 248 to the liquid level within the bottle. Any air that is displaced within stem 234 escapes through orifice 240 into the air chamber 242 formed within the bottle above the liquid level.

The container 212 is simply inverted to dispense a measured dose of liquid. Upon inversion of the container, the measured dose of liquid is captured within shell 228, stem 234 and tube 248. The liquid within stem 234 flows through the stem and out the spout 238. The vacuum that is created causes the liquid within tube 248 and thereafter air to enter the container to replace the volume of the liquid that is dispensed. When the entire measured dose has been dispensed, the flow diminishes and thus gives a signal that the dispensing has been completed.

It should be noted that tube 248 may be arranged with its lower end located outside the lower end of the shell 228 but near the bottom part of the container interior where it can provide air to displace the liquid that flows out of shell 228 during dispensing of the liquid, thus preventing vacuum from impeding the dispensing. Then, the liquid in tube 248 is discharged outside of the shell and is not dispensed through stem 234, thus increasing the accuracy of the dosage slightly.

FIGS. 5–7 illustrate a dispensing device 310 which is similar to the device 10 but is equipped with an arrangement for adjusting the effective size of the aperture in the stem 334. In the device 310, the stem 334 is provided with three small openings 341 which together perform the function of the single orifice described for the other embodiments. The openings 341 are located in the air chamber 342 and are spaced apart around the circumference of stem 334.

An adjustment sleeve 350 is fitted rotatably on stem 334 adjacent the openings 341 and is provided with a circumferential slot which forms a window 352 long enough to span all three openings 341. The top end of sleeve 350 projects through the cap 320 and forms a knob 354 which is accessible to permit the sleeve to be rotated. A visual indication of the rotative position of sleeve 350 is provided by a pointer 356 which is adjacent the upper surface of cap 320. As shown in FIG. 6, the cap surface is marked with the letters "s", "M" and "L" which represent small, medium and large doses, respectively, and which the pointer 356 aligns with in the different positions of sleeve 350. A seal element 360 forms a liquid tight seal between the sleeve and cap. Preferably, the cap and stem are molded in a single piece and are connected by a pair of arms 362.

The purpose of arms 362 is to prevent stem 334 from rotating with sleeve 350; however, this purpose could be achieved in many ways. One way is by the use of a shell 328 which fits into well 326 in only one position so as to prevent rotational and axial movement of shell apparatus 328, 336 and 334 once inserted in well 326. Snap-friction joints between shell 328 and well 326 would be well suited for this purpose.

In use, the dispensing device 310 dispenses measured doses of liquid in the same manner as the device 10 described earlier. However, the device 310 permits the effective orifice size to be adjusted in order to adjust the dosage that is dispensed. The adjustment is carried out simply by turning the knob 354 to rotate sleeve 350 to the desired position. FIG. 5 shows the sleeve in position for dispensing a large dose because the window 352 is positioned in registration with all three openings 341 so they are all exposed to maximize the effective orifice size. In this position, the arrow 356 points to the "L" mark to provide a visual indication that the mechanism is set to dispense a large dose.

When the sleeve is rotated to align pointer 356 with the "M" mark (medium setting), the window 352 registers with only two of the openings 341 and the third opening is covered by sleeve 350 so that only ⅔ of the maximum area of the orifice is exposed through the window. As a result, less liquid is dispensed through the orifice and the dosage is reduced in comparison to the large setting. The small setting is where pointer 356 aligns with the "S" mark and window 352 aligns with only one of the openings 341. Then, the orifice exposure is only ⅓ of its maximum, and the dosage amount is reduced accordingly.

It is thus evident that the dosage adjustment mechanism allows quick and easy adjustment of the amount of liquid that is dispensed during each dispensing cycle. It is noted that the openings 341 can have the same or different shapes and/or sizes and could be replaced by a single slit or other opening that would be partly exposed in the reduced dosage setting and progressively increased in exposure toward the "large" setting. The cover which controls the orifice exposure can slide axially on the stem rather than circumferentially if so desired. Although three different dosage settings are illustrated, it is to be understood that a different number of settings can be provided depending upon the number of different dosages it is desired to dispense. In any event, the dosage dispensed at each setting is accurately reproduced during each dispensing cycle when the indicator is turned to that setting.

FIG. 8 illustrates a dispensing device 410 which is constructed in large part like device 10 but which includes a specially constructed shell 428 that permits the dosage to be adjusted by the user. The shell 428 is provided with flexible pleats 464 on its side wall in order to provide the shell with a bellows type construction enabling it to expand and contract in accordian fashion. The base 430 of shell 464 is connected with the bottom 430 of the bottle by a small tab 466 or in any other suitable manner. When the shell 464 is expanded to the broken line position of FIG. 8, its volume is increased considerably over its volume in the collapsed position shown in solid lines.

The stem 434 extends slidably through the cap 420 and is provided with a plurality of axially spaced grooves 468 in its outer surface. The grooves 468 receive the edge of the opening in the cap 420 to provide a detent which holds the stem 434 axially in place to maintain the shell fully expanded, partially expanded or fully contracted. Immediately above the respective grooves 468, the letters "S" (small), "M" (medium) and "L" (large) are imprinted on stem 434. A finger grip formed by a ring 470 or other means is provided on the exterior end of stem 434 to facilitate axial extension and retraction of the stem.

In use, the dispensing device 410 dispenses liquid in the same manner described for device 10. The quantity of the dose is controlled by the volume presented within shell 428, and this in turn depends upon the axial position of stem 434. When the upper groove 468 is gripped by the cap 420, shell 428 is fully contracted and presents its minimum volume, so the dosage that is dispensed is relatively small as indicated by the position of the "S" mark adjacent the cap. Stem 434 can be pulled upwardly until the second ("M") groove is gripped by the cap edge, and the medium setting is then achieved as indicated by the presence of the "M" mark adjacent the cap. The shell 428 is then partly expanded to hold a dose that is greater than dispensed at the small setting. The fully expanded condition of the shell is achieved by pulling stem 434 fully upwardly until the lowest groove 468 registers with the cap opening and the "L" marking adjacent the cap indicates that the large dose setting is in effect. The shell then presents its maximum volume to dispense large doses of liquid.

The settings can be provided in virtually any number, and the shell can be constructed to expand and contract in volume in ways other than the accordian arrangement which is illustrated (such as an inverted piston and cylinder that would allow the shell length to be varied). It is important to recognize that the orifice 440 must remain in the air chamber 442 at all settings of the dosage level in order for proper dispensing action to occur. This can be conveniently accommodated by utilizing a long neck bottle and/or a cone shaped cap in the event that problems occur with the more conventional bottle shape.

Figure 9:
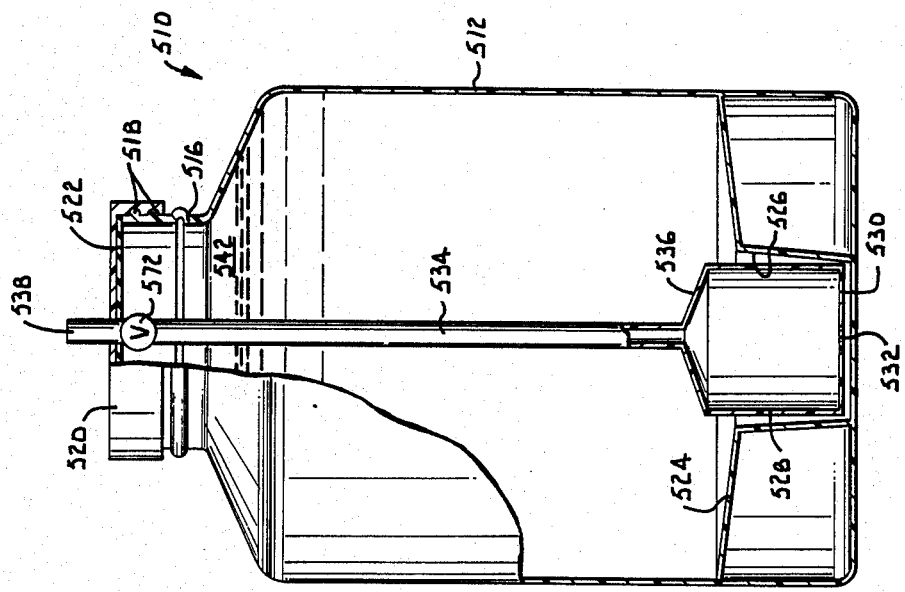
FIG. 9 is an elevational view of another embodiment of the dispensing device, with portions broken away and shown in section for illustrative purposes.

FIG. 9 depicts still another dispensing device 510 which is identical to device 10 except that a valve 572 is provided on stem 534 to control flow through the orifice which provides communication between the stem interior and the air chamber 542 formed above the liquid level in container 512. The valve 572 may be any of a variety of types, including automatic and manually operated. If manually operated, the valve should be closed when container 510 is inverted and opened to allow pressure equalization when the container is returned to the upright position. If automatically acting, the valve must be closed when the container is inverted and open when the container is upright. Examples of valves that can be used include gravity operated valves and pressure operated valves such as reed valves, as well as virtually any type of check valve which permits flow of air through the valve from the stem 534 into the air chamber 542 but blocks the flow of liquid in the opposite direction from the bottle interior into the stem.

In use, the dispensing device 510 dispenses liquid in substantially the same manner as device 10. However, during the dispensing of liquid out of stem 534 in the inverted position of the container 512, liquid is unable to flow into the stem through valve 572 and only the liquid in the shell 536 and stem 534 is dispensed, thus increasing the dosage accuracy somewhat. When the bottle is returned to the upright position, outside air is able to enter chamber 542 through end 538 of the stem and valve 572, thus providing pressure equalization and allowing a new dose of liquid to fill shell 536 and rise within stem 534 to the liquid level in the bottle.

It should be pointed out that the valve 572 can be provided on the embodiments shown in FIGS. 4, 7 and 8. It should also be noted that since the function of the valve is to provide for pressure equalization at the end of each dispensing cycle, the valve may be located on the container body or cap so long as it provides a path for air to flow into the air chamber located above the liquid level in the bottle.

Figure 10:
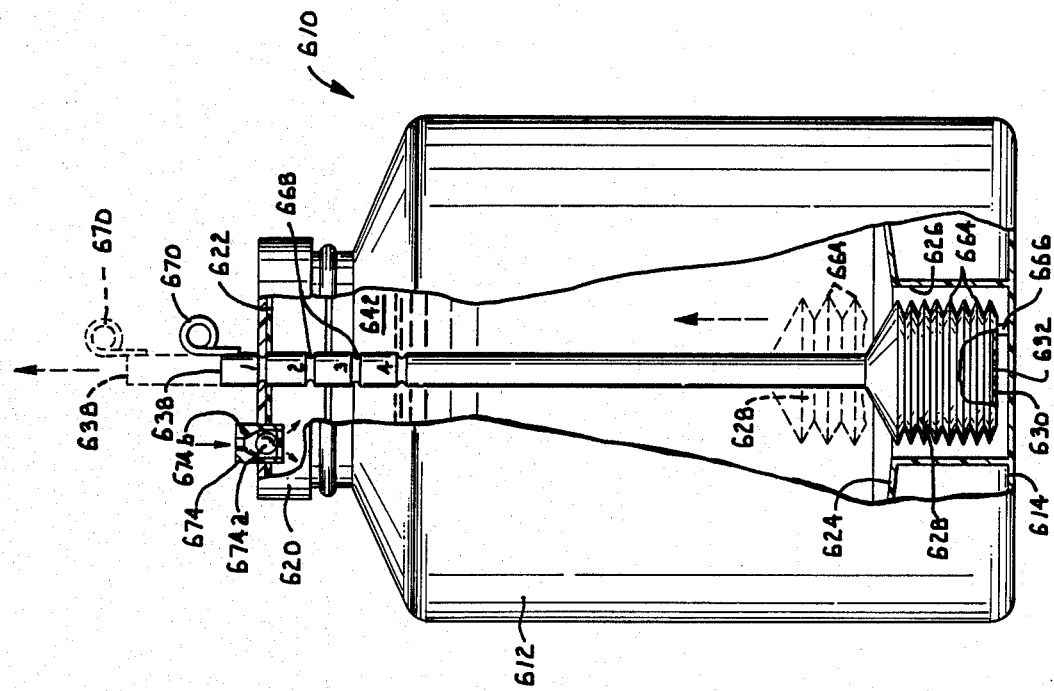
FIG. 10 is a fragmentary elevational view of a still further embodiment of the dispensing device, with portions broken away and shown in section for illustrative purposes.

FIG. 10 illustrates a dispensing device 610 which is equipped with a valve 674 on the top of the cap 620. Device 610 is in all other respects identical to the device 410 shown in FIG. 8, except that there is no orifice in the stem 634 of the FIG. 10 device. Valve 674 is a ball check valve having a ball 674a which drops off of its seat 674b when the container 612 is upright. Then, valve 674 is open and air can enter chamber 642 from outside of the container, as shown by the directional arrows. When container 610 is inverted, ball 674a falls against its seat 674b under the influence of gravity assisted by the pressure of the liquid in the container. Seating of ball 674a closes valve 674 and prevents liquid from spilling out through the valve.

In use, device 610 dispenses liquid in substantially the same manner as device 410, and the dosage may be adjusted similarly. The check valve 674 allows outside air to enter chamber 642 for pressure equalization when the container is upright and also accommodate liquid entry into the bellows type shell 628. When container 612 is inverted, valve 674 automatically closes and only the measured dose of liquid in the shell and stem is dispensed.

The bellows type arrangement with the vertically sliding stem is particularly well suited for provision of a valve on the cap of the container (or the upper portion of the container body), because the elimination of the need for an orifice on the stem allows greater axial movement of the stem and consequent greater dosage variation. However, a valve such as valve 674 can be provided on other embodiments of the invention and the adjustable bellows (or other adjustable shell size) embodiment can be provided with a stem mounted valve if desired. It should also be noted that the ball check valve 674 is only exemplary of one type of valve that may be employed; other valves can be used as well, including pressure operated valves, gravity operate valves and manually operated valves.

Figure 11:
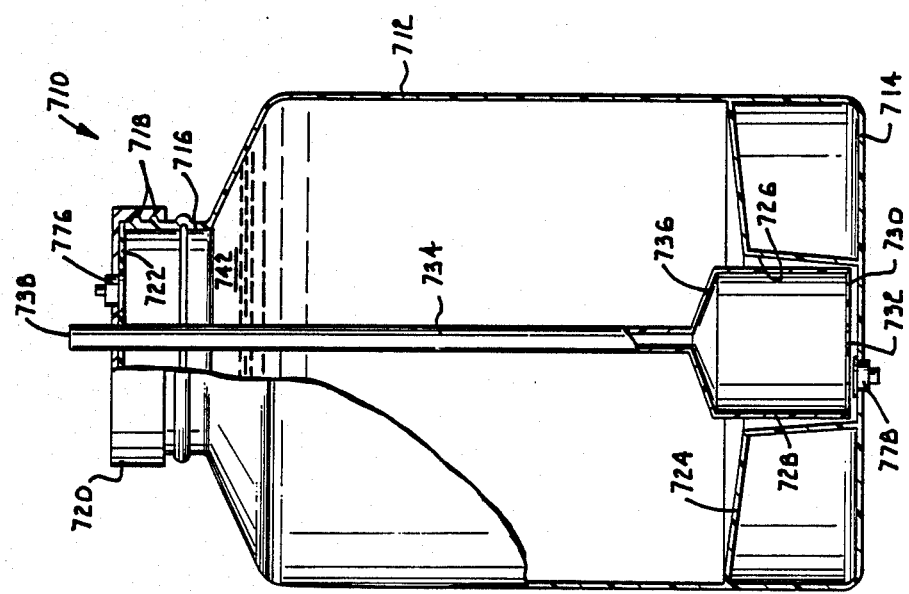
FIG. 11 is an elevational view of an additional embodiment of the dispensing device, with portions broken away sand shown in section for illustrative purposes.

FIG. 11 shows a dispensing device 710 which may be identical to device 10, except that there is no orifice in the stem 734. Container 712 is not squeezable but is instead a rigid or semi-rigid wall bottle, and valves 776 and 778 are provided. Valve 776 is located on top of cap 720 and allows outside air to enter air chamber 742 when open. Valve 778 is located on the bottom 714 of the container 712 at a location immediately below the bottom 730 of shell 728. When open, valve 778 allows outside air to enter the bottom of container 712 when the container is inverted, thus allowing the liquid in shell 728 and stem 734 to be dispensed without creating a vacuum. Valves 776 and 778 may be spring loaded to bias them toward the closed position and each provided with a button which may be pushed to open the valve.

In use, device 710 dispenses measured doses of the liquid it contains in a manner similar to that described for the other embodiments of the invention. When container 712 is upright, valve 776 is opened to admit air which allows liquid to fill shell 728 and rise within stem 734 to the liquid level in the container 712. Valve 776 is then closed and the container is inverted. After the container has been inverted, valve 778 is opened so that air is admitted to displace the liquid which is then able to flow out of shell 728 and stem 734 through the spout 738. Once all of the liquid in the shell and stem has been dispensed, valve 778 is closed and the bottle is returned to the upright position. At the start of the next dispensing cycle, valve 776 is opened so that air can displace the liquid which enters the shell and stem to constitute the next dose.

Again, the valves 776 and 778 may take an a variety of forms and need not be the manually operated valves shown. In addition, the valves can be at locations other than those shown, so long as they provide air to air chamber 742 when the container is moved to the upright position (allowing liquid to enter the shell and stem) and to the bottom part of the container when it is inverted (allowing liquid to be dispensed without creating a vacuum).

The two valve arrangement shown in FIG. 11 is applicable to other embodiments of the dispenser, including the expansible shell mechanism provided by the bellows or other variable volume mechanism.

Figure 12:
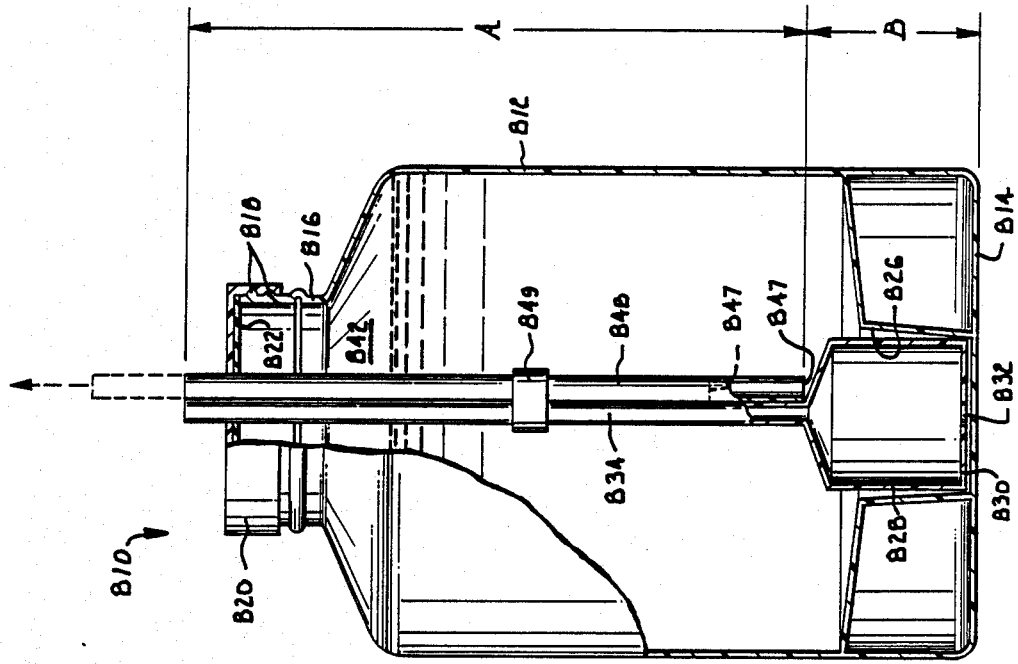

FIG. 12 depicts a dispensing device which is identical to the FIG. 4 arrangement, except that the tube 848 extends along side stem 834 rather than within the stem as is the case in the FIG. 4 embodiment and the orifice has been omitted. Tube 848 may slide axially relative to stem 834, as indicated by the broken lines in FIG. 12, in order to raise and lower its open bottom end 847. A bracket 849 secures tube 848 alongside stem 834 while permitting the tube to slide up and down.

Operation of the dispensing device shown in FIG. 12 is substantially the same as that of the FIG. 4 embodiment, with some exceptions. When the device 810 is shipped or otherwise handled prior to its initial use, it may be oriented on its side or in a variety of other positions which would allow both the stem 834 and the tube 848 to fill with liquid. To dispense an initial dose of the contents of the container 812, the container is inverted. At this time, the head pressure applied to stem 834 is equal to the sum of the dimensions A and B. At the same time, the head pressure applied to tube 848 is equal to the dimension A. Because the stem receives a larger head pressure, the liquid contained in it begins to exit from the container through the stem, thus creating a vacuum which causes the liquid contained in tube 848 to be drawn into the container to displace the liquid that is dispensed through the stem. Eventually, all of the liquid in the stem will have been drawn back into the container, and ambient air is thereafter drawn through tube 848 until the entire contents of stem 834 and shell 828 have been dispensed. Thus, the initial dose that is dispensed includes the liquid contained in the stem 834 as well as that in the shell 828. At the end of the dispensing operation, the bottle is returned to its upright position.

When the bottle is returned to the upright position, air is trapped both in tube 848 and in stem 834. Since the end 847 of tube 848 is above opening 832 by the distance B, the difference in head pressure results in air entering the bottle from the exterior through tube 848. As a consequence, liquid is able to flow into shell 828 until the liquid rises to the level of the lower end 847 of tube 848. At this point, an equilibrium state is achieved and the liquid cannot rise above this level in either the stem 834 or the tube 848 since no air could enter to displace the liquid.

The second dispensing cycle involves inversion of the bottle to permit the liquid that is trapped within shell 828 to be dispensed through stem 834, and the liquid that is dispensed is displaced by air which enters through the tube 848. Once all of the liquid in shell 828 is dispensed, the dispensing cycle has been completed and the bottle can be returned to its upright position.

Subsequent dispensing operations occur in the same manner. It is pointed out that whereas the initial dispensing dosage includes the liquid contained in shell 828 and that contained in stem 834, the second and all subsequent dispensing doses include only the liquid which is contained in the shell 828 (unless the bottle is allowed to assume a horizontal position long enough for liquid to flow into the stem 834). As a result, subsequent to the initial dispensing, the dispensing dosage is consistent from one dispensing cycle to another.

By sliding tube 848 up or down, the quantity dispensed during each dispensing cycle can be varied. The level to which the liquid rises within shell 828 and stem 834 each time the bottle is returned to its upright position is determined by the level of the lower end 847 of tube 848. Thus, by sliding tube 848 upwardly, the dispensing dosage can be increased. Conversely, the dosage is decreased by sliding tube 848 downwardly. After the bottle has been returned to its upright position and enough time has elapsed to allow the liquid level to rise within stem 838 to the level of the lower end 847 of the tube, the tube can again be pushed downwardly until its upper end is side by side with the dispensing spout of stem 834.

It should be noted that the container 812 should not be filled to a level high enough that, upon inversion of the bottle, the lower end 847 of the tube would be immersed in liquid. If the bottle were filled excessively after the contents of the stem and shell were emptied, fluid would be able to exit through tube 848 until the level of liquid contained in the bottle was coincident with end 847 of the tube. This would not result in the dispensing of accurate doses.

It is to be noted that when the container is a non-squeeze bottle, it is necessary to allow air ingress to the air chamber above the liquid when the container is upright so that the air is able to displace the liquid that flows into the shell and stem. This air ingress may be accommodated through an orifice in the stem, through a valve in the stem, cap or container body or in some other manner. It is also necessary to allow air ingress to the volume above the (inverted) container during dispensing so that the air can displace the liquid that is being dispensed. This air ingress to the bottom part of the container can be provided by a valve in the container, through a tube which extends from outside the container to the interior of the container near its bottom, either inside or outside of the shell, or in any other suitable manner.

The shell which receives the liquid to be dispensed must open into the container in a manner to encourage filling of the shell with liquid when the container is upright, and the liquid captured in the shell must not be able to escape to any appreciable extent when the container is inverted. A passageway such as a hollow tube or stem must lead from the shell to the exterior of the container to dispense the shell contents, and the orientation of the stem must be such that the entire contents of the shell are dispensed when the container is inverted but liquid is retained in the shell when the container is upright. The stem may be inclined somewhat rather than vertical as shown. The shape of the shell should encourage complete emptying of its contents into the stem, such as by providing a funnel shaped transition from the shell to the smaller stem. Finally, the volume of the shell may be made adjustable, such as by means of an expansible bellows a cylinder and piston or any other variable volume mechanism.

It should be noted that the device shown in FIG. 4 can be equipped with adjustment mechanisms of the type shown in FIGS. 5 and 8, as can other types of dispensers. It is contemplated that graphs will be provided to show the dosages that result from the different settings of either type of adjustment mechanism.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. Apparatus for dispensing liquid in measured amounts, said apparatus comprising:
   a squeezable container for holding the liquid, said container being substantially fluid tight and having top and bottom portions with said top portion presenting a chamber in the container above the liquid when the container is in an upright position;
   a hollow shell in said container adjacent said bottom portion thereof, said shell having an opening for entry of liquids from the container into the shell;
   a tube having a base end communicating with said shell to receive liquid therefrom and a spout end opposite said base end for dispensing of liquid from the container, said spout end being located outside of the container adjacent said top portion thereof; and
   an orifice in said tube at a location intermediate said base and spout end of the tube to supply air from the outside to said chamber in the upright position of the container,
   whereby said container can be inverted and squeezed to dispense the liquid in said shell and tube during a dispensing cycle, said orfice acting to equalize the pressure within the container when same is returned to an upright position and additional liquid in the container flows into said shell thorough the opening therein and said orifice providing a path for liquid to enter said tube from the container during each dispensing cycle.

2. Apparatus as set forth in claim 1, including a well in said bottom portion of the container, said shell fitting in said well.

3. Apparatus as set forth in claim 1, including means for adjusting the size of said shell to adjust the volume of liquid received therein, thereby adjusting the amount of liquid dispensed upon inversion of the container.

4. Apparatus as set forth in claim 1, including means for adjusting the size of said orifice to control the amount of liquid dispensed through the orifice into the tube upon inversion and dispensing during each dispensing cycle.

5. Apparatus as set forth in claim 4, wherein said adjusting means comprises:
   a cover for the orifice; and
   means for mounting said cover on said tube for movement between a first position wherein said orifice is exposed and a second position wherein at least part of the orifice is blocked by the cover to reduce the effective size of the orifice.

6. Apparatus as set forth in claim 5, including indicator means for visually indicating the position of said cover.

7. Apparatus as set forth in claim 5, wherein:
said cover comprises a sleeve received on said tube for rotation thereon between the first and second positions; and
said sleeve presents a window which fully registers with said orifice in the first position of the sleeve to fully expose the orifice through the window and which is at least partly out of register with the orifice in the second position of the sleeve to at least partly block the orifice.

8. Apparatus as set forth in claim 7, wherein:
said orifice comprises a plurality of openings in said tube spaced apart thereon; and
said window is arranged to expose all of said openings in the first position of the sleeve and to block at least one of the openings in the second position of the sleeve.

9. A dispensing device for dispensing liquid in measured amounts, said device comprising:
a non-pressurized, rigid, substantially fluid tight container for holding liquid, said container having top and bottom portions and an air chamber in said top portion above the liquid level in the container;
a hollow shell in the bottom portion of said container, said shell having an opening therein for entry of liquid from the container;
a hollow stem providing a flow passage extending from said shell through the top portion of the container and terminating in a dispensing spout located outside of the container for dispensing of the liquid; and
a vent tube extending within the container at a location outside of said stem, said vent tube having an open lower end defining the level to which liquid can flow into the shell and an open top end located outside of the container to receive outside air.

10. The device of claim 9, including means for adjusting the size of said shell to adjust the volume of liquid received therein, thereby adjusting the amount of liquid dispensed.

11. The device of claim 9, including means for mounting said vent tube for axial sliding movement along the stem to adjust the level of said lower end of the vent tube in the container.

12. Apparatus for dispensing liquid in measured amounts, said apparatus comprising:
an internally pressurized container for holding the liquid, said container being substantially fluid and pressure tight and having top and bottom portions with said top portion presenting a chamber in the container above the liquid when the container is in an upright position;
a shell and tube structure comprising a hollow shell in said container adjacent said bottom portion thereof and a tube extending from said shell hollow and terminating in a spout end located outside of the container for dispensing of liquid from the container, said shell having an opening for entry of liquid from the container into the shell;
an orifice in said tube at a location intermediate said hollow shell and spout end; and valve means on said spout end for opening and closing said tube,
whereby said container can be inverted and the liquid in said shell and tube can be dispensed under pressure upon opening said valve means, said orifice acting to equalize the pressure within the container when same is returned to an upright position and additional liquid in the container flows into said shell through the opening therein after closing said valve means.

13. Apparaus as set forth in claim 12, including means for adjusting the size of said orifice to control the amount of liquid dispensed through the orifice into the tube upon inversion and dispensing.

* * * * *